United States Patent [19]

Mabry

[11] 4,080,707

[45] Mar. 28, 1978

[54] BUSHING SERVICE TOOL

[76] Inventor: Roger J. Mabry, 772 Teakwood La., San Dimas, Calif. 91773

[21] Appl. No.: 789,021

[22] Filed: Apr. 20, 1977

[51] Int. Cl.[2] .............................................. B23P 19/04

[52] U.S. Cl. ........................................................ 29/263

[58] Field of Search .................................. 29/263, 256

[56] References Cited

U.S. PATENT DOCUMENTS

| | | | |
|---|---|---|---|
| 1,601,734 | 10/1926 | Goode | 29/263 |
| 1,972,455 | 9/1934 | Miller | 29/263 |
| 2,036,782 | 4/1936 | Ullmo | 29/263 |
| 2,596,549 | 5/1952 | Hamilton | 29/263 |
| 3,041,713 | 7/1962 | Gronlund | 29/256 |
| 3,862,483 | 1/1975 | Kloster | 29/263 |

*Primary Examiner*—Jimmy C. Peters

*Attorney, Agent, or Firm*—Sellers and Brace

[57] ABSTRACT

A bushing service tool adapted to replace aligned bushings without risk of distorting or damaging the bushing support structure. The tool includes a nut equipped bolt having a close fit through a plurality of bushings and a cooperating strut member sized to have a snug fit between and to rigidify the adjacent sides of the bushing support structure during use of the tool.

4 Claims, 3 Drawing Figures

BUSHING SERVICE TOOL

This invention relates to service tools, and more particularly to an improved bushing service tool to replace one or more of a plurality of aligned bearings without damaging the supporting structure therefor.

Various proposals have been made heretofore for tools usable to replace bushings commonly held pressed into a bore of a machine or other supporting structure. Such service tools utilize bolts or threaded shanks extendable through one or a plurality of aligned bushings and wherein a nut or a sleeve mounted on the bolt shank utilizes the new bushing to replace a worn bushing as the tool nut is tightened. Examples of such prior service tools are shown in Hamilton U.S. Pat. No. 2,596,549, Miller 1,972,455, Hersee 1,599,176 and Starkey 1,428,815. Such tools are quite satisfactory where the bushing supporting structure is sufficiently rigid to withstand the stresses involved in displacing a worn bushing with a new one as appears to be the case in the structural environments serviced by the tools of the above mentioned patents. However, in many other operating environments design specifications including space, strength requirements and the need for lightweight materials, are so restrictive that it has been necessary to replace the entire supporting structure when the bushings become worn and unserviceable. Any attempt to replace these bearings with bushing service tools heretofore devised causes breakage, damage or intolerable distortion of the structure.

Accordingly, there is provided by this invention an improved bushing service tool incorporating strut means specially designed to reinforce and protect the bushing supporting structure from damage while the bushing is being replaced. This strut is sized and shaped for snug assembly between the adjacent sides of the bushing support structure immediately adjacent the bushings being serviced and holds this structure rigidly and firmly during this operation.

Accordingly, it is a primary object of this invention to provide an improved, rugged bushing service tool including means for preventing distortion, breakage or damage to the bushing support structure during a servicing operation.

These and other more specific objects will appear upon reading the following specification and claims and upon considering in connection therewith the attached drawing to which they relate.

Referring now to the drawing in which a preferred embodiment of the invention is illustrated:

Figure 1:
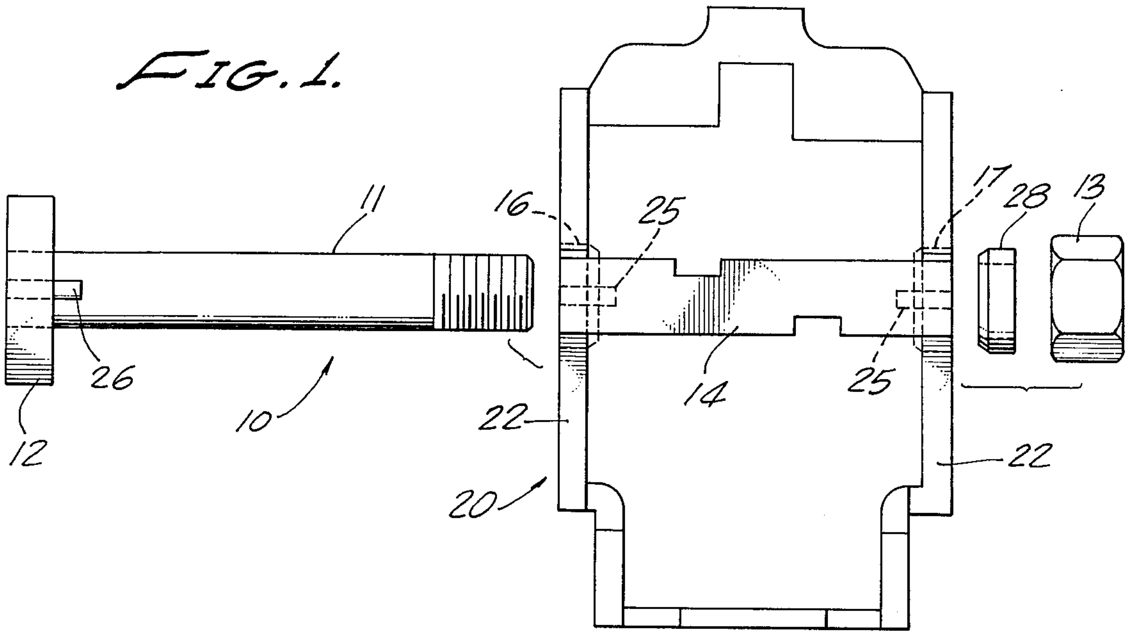
FIG. 1 is an exploded view of the improved bushing service tool in the process of assembly to a pair of aligned bushings for the replacement of one thereof by a new bushing.
Figure 2:
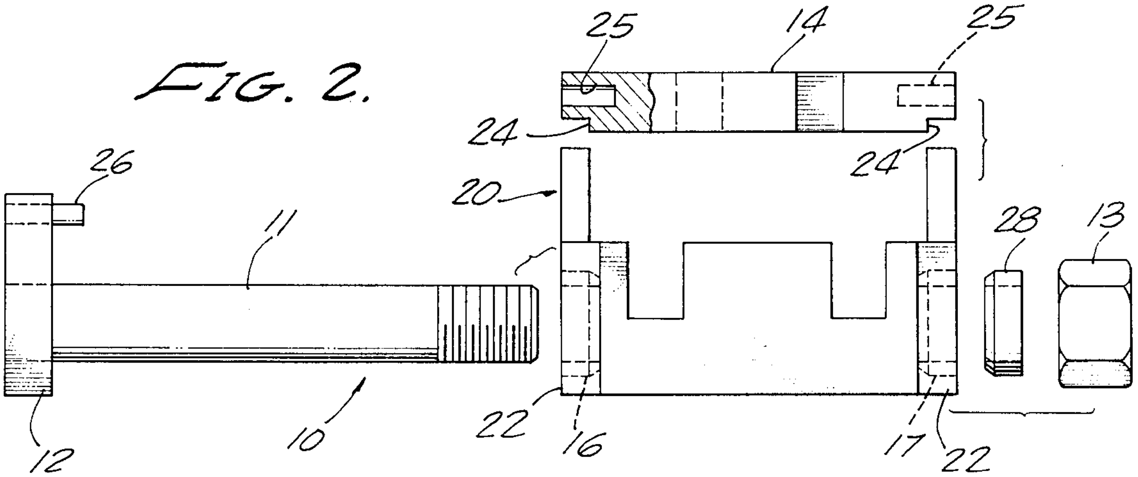
FIG. 2 is an end elevational view of FIG. 1.

The invention service tool, designated generally 10, comprises a bolt having a threaded shank 11, a head 12, a nut 13, and a strut member 14. As herein shown by way of example, the servicing tool 10 is sized for use in replacing the bushings 16 and 17 of a lightweight generally rectangular frame 20 employed to support the print head of a typewriter of the type disclosed in U.S. Pat. of L. E. Palmer No. 2,919,002 granted Nov. 17, 1964. Such print heads are mounted in an upright position on a horizontal shaft having its ends journalled in bushings 16,17. These bushings have a strong press fit in the aligned seating bores formed in the opposite sidewalls 22,22 of a support frame 20. This frame is sufficiently strong and rugged to withstand the environmental operating forces but is inadequate to withstand, without serious risk of damage or distortion, the forces involved in replacing the worn bushings 16,17 with new bushings. These risks are completely eliminated by the present invention. Thus, the high strength strut member 14 has shouldered ends spaced apart to seat snugly against the interior faces of the frame sidewalls 22,22, in the manner made clear by FIG. 3. As herein shown, each end of strut 14 is provided with a well 25 to receive a locator pin 26 projecting axially from the inner face of bolt head 12 when the strut is properly positioned in close parallel alignment with the axes of the bushings being serviced.

In use and assuming that bushing 17 is in need of replacement, the user assembles strut 14 between the sides of frame 22 with the shoulders 24 fully seated as shown against the edges of the frame sidewalls. The shank 11 of bolt 10 is then inserted through the bushings care being taken to shift the strut lenghthwise of walls 22 as necessary for the insertion of pin 26 in to the adjacent one of wells 25. This having been done the strut is locked positively in position and against risk of disassembly and bolt 11 is locked against rotation about its axis. A new bushing 28 is then assembled over the threaded end of shank 11 and nut 13 is assembled to the bolt and tightened. Strut 14 cooperates with pin 26 and head 12 to hold the bolt against rotation as nut 13 is wrenched to insert the new bushing 28 while simultaneously displacing the old bushing 17. This having been accomplished, the service tool is disassembled.

Figure 3:
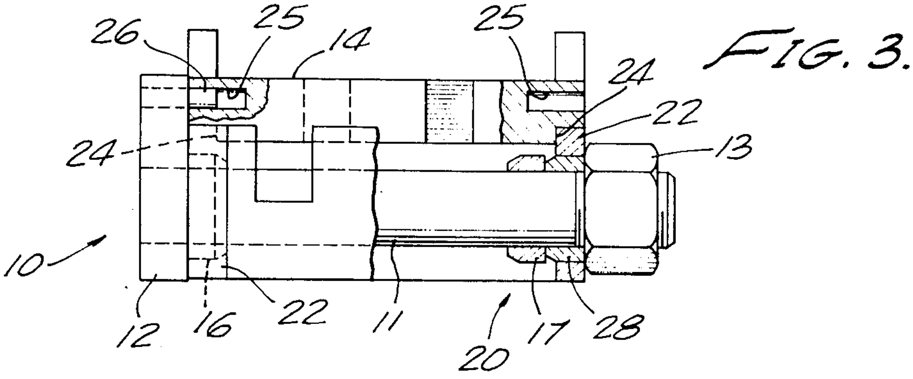
FIG. 3 is a view similar to FIG. 2 with portions broken away to show structural details and showing an old bushing immediately after being displaced by the assembly of a new bushing.

If it is desired to replace the bushing 16, as is usually the case, the service tool is used as described above except that the bolt is usually reversed and inserted from the right hand side of FIG. 3. Affer the second bushing is in place the service tool is removed and the reconditioned frame 20 is in readiness for reassembly and use with full assurance that the new bearings are accurately aligned with one another and that frame 20 has not been warped, distorted or damaged in any way.

While the particular bushing service tool herein shown and disclosed in detail is fully capable of attaining the objects and providing the advantages hereinafter stated, it is to be understood that it is merely illustrative of the presently preferred embodiment of the invention and that no limitations are intended to the detail of construction or design herein shown other than as defined in the appended claims.

I claim:

1. A bushing service tool for use in substituting one or more of a plurality of aligned bushings without risk of distoring the environmental support structure for said bushings comprising: elongated threaded bolt means extendable loosely through a plurality of said aligned bushings, said bolt means being adapted to support a new bushing thereon with one end in contact with a worn bushing to be displaced by said new bushing, a nut for said bolt means operable while being tightened to replace a worn bushing with a new bushing, and rigid strut means insertable between adjacent sides of said support structure closely beside the bushing seating openings thereof while said bushings are being serviced and effective to prevent damage to said support structure while said nut is being tightened along said bolt means.

2. A bushing service tool as defined in claim 1 characterized in the provision of mutually cooperating means on said bolt means and on said strut means for holding the same positively in close side-by-side relation and generally parallel to one another while said bolt means is in use to service a pair of said aligned bearings.

3. A bushing service tool as defined in claim 1 characterized in that said bolt means and said strut means are provided with interengaging means for locking said strut means detachably assembled closely beside said bolt means with end portions thereof abutting a juxtaposed surface of said bushing support structure to prevent distortion and damage thereof while said nut is being tightened to service said bushing and to lock said bolt against rotation about the axis thereof.

4. A bushing service tool as defined in claim 1 characterized in that said bolt means is provided with means mateable with complementally shaped means on said strut means during assembly of said service tool through a pair of aligned bearings to be serviced and effective to lock said strut means to said bolt means so long as said bolt means is in use and cooperating with said strut means to hold the latter close to said bolt means with portions of the ends thereof of said strut means abutting a juxtaposed surface of the bushing support structure to prevent distortion thereof while said nut is being tightened.

* * * * *